Dec. 11, 1934.  C. C. JACOBSON  1,983,761
WELDLESS DIE BLOCK FOR EXTRUSION PRESSES AND METHOD OF EXTRUDING
Filed Aug. 12, 1932   2 Sheets-Sheet 1

INVENTOR
Conrad C. Jacobson
BY
Fraser, Myers & Manley
ATTORNEYS.

Dec. 11, 1934.  C. C. JACOBSON  1,983,761
WELDLESS DIE BLOCK FOR EXTRUSION PRESSES AND METHOD OF EXTRUDING
Filed Aug. 12, 1932   2 Sheets-Sheet 2

INVENTOR
Conrad C. Jacobson,
BY
Fraser, Myers & Manley
ATTORNEYS.

Patented Dec. 11, 1934

1,983,761

UNITED STATES PATENT OFFICE 1,983,761

WELDLESS DIE BLOCK FOR EXTRUSION PRESSES AND METHOD OF EXTRUDING

Conrad C. Jacobson, Glen Ridge, N. J., assignor to John Robertson Co., Inc., Brooklyn, N. Y., a corporation of New York Application August 12, 1932, Serial No. 628,459

7 Claims. (Cl. 207—10)

The present invention relates to die blocks for extrusion presses and to the method of extruding metals therethrough, and aims to provide certain improvements therein.

In extrusion presses as at present constructed the extruding metal, in passing along the die block core, is caused to divide into two or more streams which, under the heat and pressure of the extruding operation, are caused to reunite and weld together. At their lines of union or welding the extruded sheaths develop what are known as joint defects, which frequently cause failure of the covered cables.

An object of my present invention is to overcome these joint defects and provide a method of extruding a weldless, seamless metal sheath for cable and the like. Another object is to provide a die block having means for insuring an even wall thickness for the extruded sheath. Still another object is to provide means for readily altering the inside conical surface of the die block adjacent the die and for preventing the jamming of the die holder with extruded metal. Still another object is to provide improved means for holding the die block sections against separation due to internal pressures created therein during the extruding operation. Additional objects of my invention are to otherwise improve the construction and functioning of split die blocks and thereby promote and increase the efficiency of extrusion presses in general.

The foregoing objects of invention I accomplish through the use of my novel split die block, the construction and functioning of which will be understood from the detailed description thereof which follows, when considered in connection with the accompanying drawings, wherein—

Figure 3:
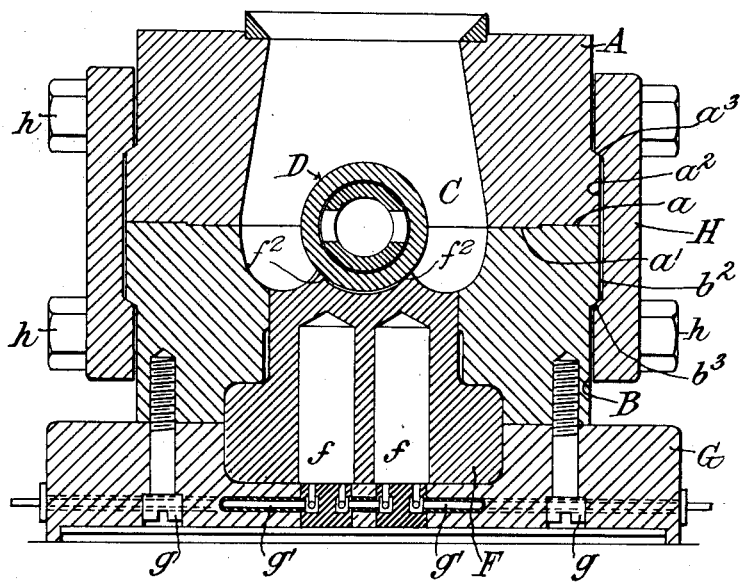
Fig. 3 is a transverse section through the die block taken substantially along the plane of the line 3—3 of Fig. 2.
Figure 4:
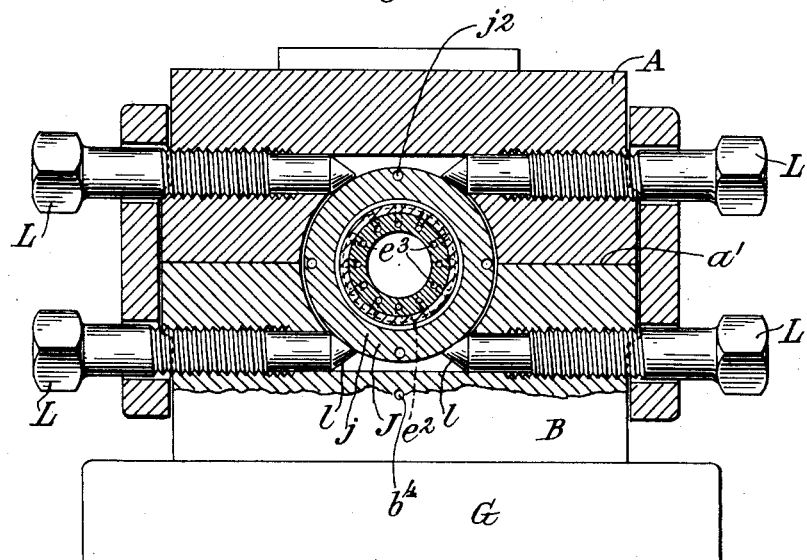
Fig. 4 is a transverse section taken substantially along the plane of the line 4—4 in Fig. 1.

Referring to the drawings in the several figures, of which the corresponding parts are represented by the same reference characters, the die block may be said to consist of upper and lower sections or halves A and B, respectively, having flat abutting faces lying in the planes $a$ and $a'$, as best seen in Figs. 3 and 4. The die block sections are cored out to provide an extrusion chamber, indicated generally by the reference character C, said chamber having a funnel-like opening $c$ in the die block section A, whereat it connects with the extrusion cylinder (not shown).

Adjustably mounted within the die block and extending the full length of the extrusion chamber, is a core D comprising a master core $d$ having a non-ferrous bushing $d'$ at its inner end, within which master core is screwthreadedly mounted a core nut $d^2$ and a core tip $d^3$, the core nut and core tip being separately formed but connected together so as to be movable longitudinally into and out of the master core as a unit.

Also mounted within the die block in axial alignment with the master core D is a screwthreaded die nut E, which at its inner end carries an extruding die $e$. The parts thus far described substantially embody the features of construction of a die block which forms the subject matter of a copending joint application of the present applicant and James Schweder, Serial No. 547,046, filed June 26, 1931.

Figure 1:
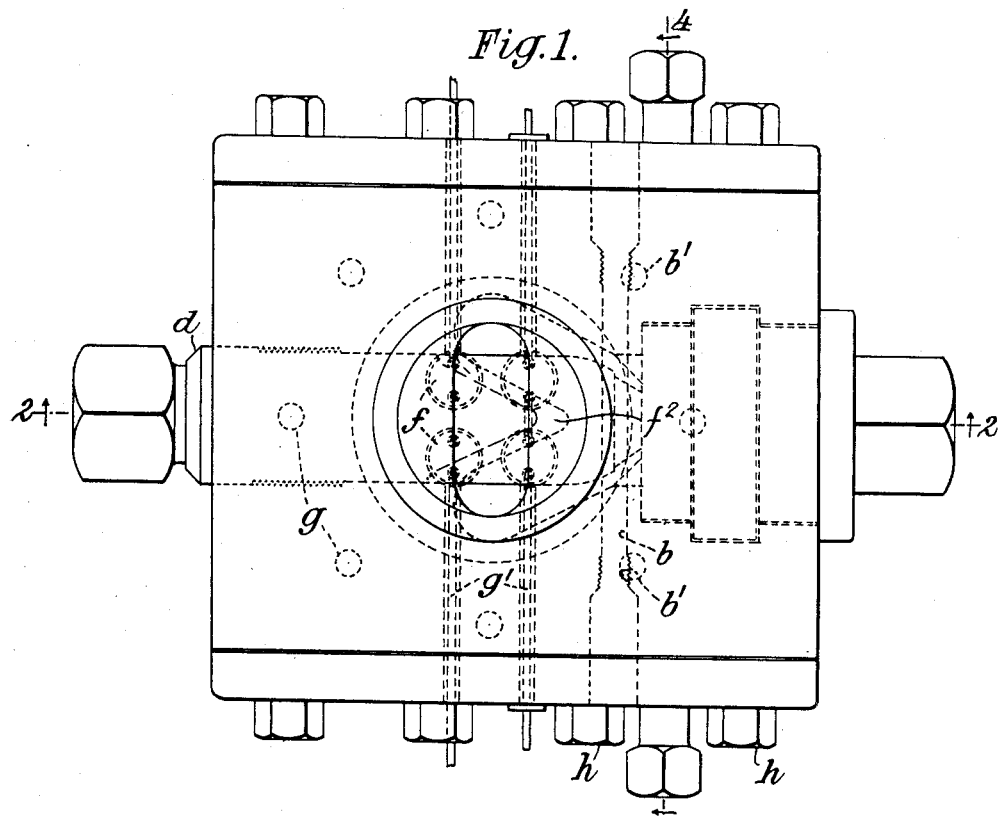
Figure 1 is a top plan view of a die block embodying my invention.
Figure 2:
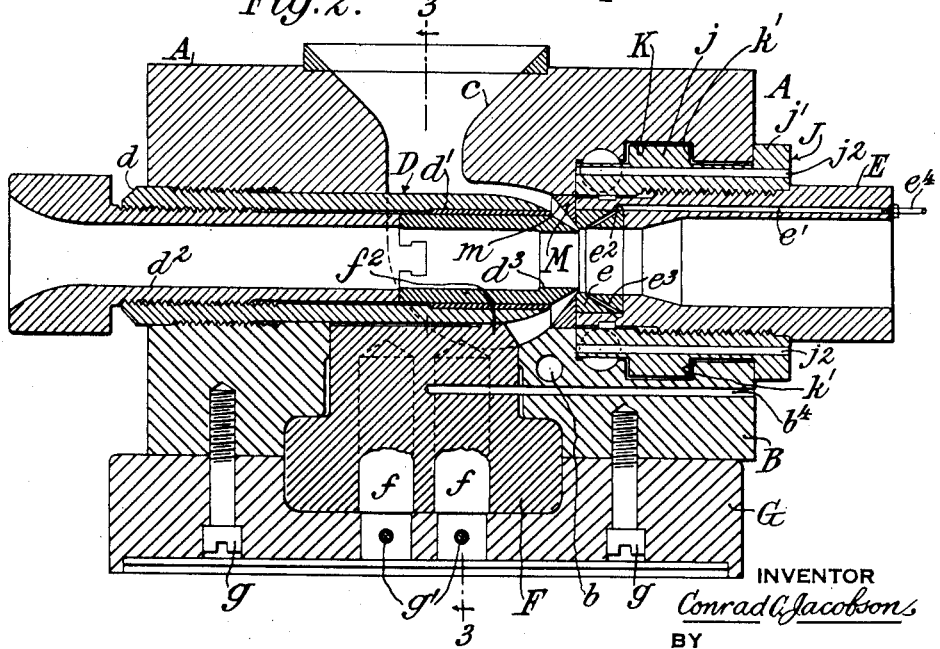
Fig. 2 is a longitudinal section through the die block, taken substantially along the plane of the line 2—2 in Fig. 1.

In die blocks of the type thus far described and other die blocks for extrusion presses, the extrusion chamber C is so constructed with respect to the core D that the extruded metal upon filling the extrusion chamber, is caused to divide when encircling the core, thereafter reuniting under the heat and pressure of the extruding operation to provide a tubular sheath. At the line of reuniting of the metal there is formed a perceptible joint or weld, which frequently gives rise to what are known as joint defects in the cable sheath, which often prove quite objectionable. To effect reuniting of the divided metal its temperature must be above a critical point, which, for lead cable sheath, is approximately 350° F., and the maintenance of this temperature throughout the extruding metal in the die-block, especially during the periods of charging the press, is apt to have a detrimental carbonizing action on paper insulation and a vulcanizing action on the rubber insulation of cables. To overcome the formation of such joint and prevent the aforementioned detrimental action, my present invention contemplates the provision of means for raising the temperature of the extruded metal only as it approaches and reaches its region of mergence whereby to cause said metal to homogeneously reunite without the formation of a welded joint and without unduly subjecting the cable to such higher temperatures. To accomplish this I introduce into the die block electric heating means which will raise the temperature of the divided stream of the extruded metal as it approaches and reaches its region of mergence, to above its critical uniting temperature whereupon it will be rendered more plastic or viscous, in which state, under extruding pressure, it will readily flow and homogeneously unite to provide a weldless sheath. As shown in the present embodiment of my invention, I accomplish this by introducing into the bottom half or section B of the die block, a heater block F, having a plurality of electric heating units $f$ therein, said heater block being disposed with respect to the extrusion chamber C so as to constitute a portion of the bottom wall of said chamber, and thus be adapted to raise the temperature of the divided stream of metal as it aproaches and reaches said bottom wall to the desired degree of plasticity or fluidity. The heater block F may be suitably held within an appropriately shaped recess in the bottom half of the die block by being mounted in a base block G which is secured to the bottom of the die block B by suitable bolts $g$. The base block G has suitable openings therein through which electric conduits $g'$ pass for supplying electric energy to the heating units $f$. The shape of the heater block F, which forms the bottom wall of the extrusion chamber, can be best appreciated from a consideration of Figs. 1 to 3 of the drawings wherein it will be seen that the top of said heater block is spaced from the core D except at the limited region of contact therewith by a raised tongue-like portion $f^2$ on the heater block. An air space is accordingly provided between the core and the heater block except at the limited region of contact, which space serves to prevent the conduction of sufficient heat from the heater block to the core to prove detrimental to the cable insulation. To effect a sufficient solidification of the extruding metal which has been rendered plastic or viscous within the chamber at the points of reuniting around the core in advance of the extruding die, in order to present metal of sufficient solidity to the said die, I prefer to cool said metal in advance of said die to approximately the temperature of the remaining portion of said metal around the core, and to accomplish this I provide in the die block section B between the heater block F and the extruding die $e$, directly below the extruding chamber, a transverse opening or passage $b$ through which cooling air may be circulated. To conduct a current of air through said opening $b$, it may be suitably screwthreaded in proximity to its opposite ends, as shown at $b'$, and then enlarged to accommodate a suitable pipe coupling (not shown).

To make the extrusion of the metal through the chamber C less sensitive to changes in wall thickness of the extruded sheath, due to variations in the temperature of the extruded metal in passing through the extruding chamber, I make the axial length of the extruding chamber substantially greater than the length of such chambers employed in presses of like capacity heretofore constructed, which provides said chamber with an effective area greater than the effective pressure area of the ram acting upon the metal within said extruding cylinder. This, of course, introduces into the die block hydrostatic pressures greater than those produced by the ram, and to insure against the die block sections opening up under these increased pressures, I have provided novel means for holding the top and bottom halves together. These means consist of having the die block sections at their opposite sides formed with raised abutting portions $a^2$ and $b^2$ which provide with the normal sides of the sections tapered shoulders $a^3$ and $b^3$, respectively, over which projections and shoulders are secured channel-like clamping members H, the inner side walls of which are tapered in complemental relation to the shoulders $a^3$ and $b^3$. These clamping members H are secured to the die blocks A and B by a plurality of cap bolts $h$.

The die nut E, according to my present invention, is preferably screwthreadedly carried by a die holder J, which is mounted within the die block sections in a manner to permit limited radial movement of said die holder with respect to the axis of the die block, for a purpose which will be presently made apparent. To accomplish this, the die holder intermediate its ends is provided with a supporting ring $j$, which seats within annular groove K in the die block sections, and has an end flange $j'$ adapted for abutting relation with the end of the die block sections. Between the supporting ring $j$ and an inner wall $k$ of the annular recess within the die block, there is disposed a ring $k'$, preferably of non-ferrous metal, such as bronze or the like, which will allow the die holder J to be radially moved or adjusted without scoring or cutting into the die block channel K.

It will be appreciated that in view of the length of the core tip $d^3$ which projects in an unsupported manner into the extruding chamber, that due to the great pressures within said chamber, the extreme end of the core tip which is disposed adjacent to the extruding die, may be deflected out of true concentricity with said die, and thereby give rise to the extrusion of sheaths of non-uniform wall thickness. To insure uniformity in the wall thickness of the extruded sheath, notwithstanding the deflection of the core tip as aforementioned, I have provided means for adjusting the extruding die $e$ in a radial direction to reestablish true concentricity between said die and core tip. This I accomplish by means of the four adjusting bolts L which screwthreadedly engage within the die block sections from the opposite sides thereof, the bottoms of the shanks of said bolts being unthreaded and of smaller diameter than the threaded portion thereof and terminating in conical ends $l$ which engage the outer periphery of the die holder J in proximity to its inner end, at circumferentially spaced points, as best shown in Fig. 4. By adjusting the bolts L, it will be appreciated that the die holder, and therefore the die carried thereby, can be radially adjusted to bring said die into true concentricity with the core tip after the latter has been deflected.

Within the extrusion chamber C and constituting the end wall of said chamber adjacent the die $e$, I provide an annular ring M having a conical inner face $m$. Said ring M has a close fit with both the die block sections and the end of the die nut, and serves to prevent the extruding metal from jamming the die holder J. Said ring M is preferably made independent of the die block and removable therefrom.

To control the temperature of the heating block, and thereby insure a proper consistency for the extruding metal within the extruding chamber at the region of mergence of said metal around the core, I provide in the die block section B and heater block F a connected passage $b^4$, into which may be inserted a thermo-couple connected with an automatic thermostat control (not shown) whereby a predetermined temperature range may be maintained. Passages $j^2$ may also be provided in the die holder J for the introduction of thermo-couples so that the temperature in proximity to the die may be ascertained. I also have made provision for cooling the extruding die, said means consisting of a longitudinal passage $e'$ through the die nut and to which is connected a pipe $e^4$ through which warm air may be introduced into said passage. The inner end of the passage $e'$ communicates with an annular passage $e^2$ in the die nut, which passage in turn communicates with a plurality of passages $e^3$ radially spaced about the circumference of the die $e$ and opening into the interior thereof in close proximity to the sheath-forming end thereof.

From the foregoing detailed description, it will be apparent that I have disclosed an improved construction of die block by means of which improved cable sheath can be produced, and one in which a novel method of producing weldless cable sheath is disclosed. While I have shown and described but a single preferred embodiment of my invention, it is to be understood that I do not wish to be limited to the details of construction set forth, since it will be apparent to a worker skilled in the art that this specific embodiment may be modified within the range of engineering skill without departing from the spirit of my invention.

What I claim is:

1. A die block comprising an extrusion chamber having a core therein which causes the extruding metal when charged into the die-block to divide when encircling said core, there being a region of mergence of said metal on one side of the core and electric heating elements in the die block adjacent the region of mergence for raising the temperature of the extruding metal in proximity thereto to its fusing temperature, whereby to cause said metal to homogeneously unite.

2. A die block comprising a die, an extrusion chamber having a core therein, said chamber having a charging opening at its top and being unobstructed at its sides and bottom around said core, and electric heating means in the bottom of the die block in proximity to the bottom of the chamber for raising the temperature of the extruding metal upon reaching said region to a point whereat under extruding action it will homogeneously unite the metal flowing around the sides of the chamber to provide a seamless sheath, the said heating means being located rearwardly from the core tip a sufficient distance to permit homogeneous union of the extrusion sheath before reaching the extrusion die.

3. A die block according to the preceding claim, having means between the heating means and the extrusion die for cooling the reheated portion of the extruding metal to approximately the temperature of the remaining portion of said metal around the core.

4. A die block for a cable sheath extrusion press having top and bottom halves, each of which at its opposite sides, at a distance from the abutting faces of the halves, is formed with a tapered shoulder directed away from the abutting faces, channel-like clamping members having walls which taper outwardly from the bottom of the channel engaging over said tapered shoulders on the die block halves on the same side of the die block, and means securing said clamping members to said respective top and bottom halves for holding them together against separation under internal pressures.

5. A split die block comprising a die holder having a supporting ring mounted within the die block and adapted for limited radial movement with relation to the die block, and a ring of softer metal than either the die holder or the die block, disposed between said supporting ring and die block, for preventing scoring or cutting of the die block and taking up the thrust of said supporting ring as the die holder is moved therein.

6. The method of extruding lead and the like metals into tubular form through a die block having a core which comprises charging the metal in a congealed state under pressure into an extrusion chamber around the core at substantially right angles to the axis of the core, thereby causing the metal to divide as it encircles the core and raising the temperature of the metal in the chamber only in proximity to its region of mergence around the core to render said metal plastic or viscous whereby to cause said metal to homogeneously unite, and then cooling the reheated portion of the tube to approximately the temperature of the diametrically opposite portion of the tube before said tube reaches the extruding die.

7. The method of forming a weldless cable sheath of lead or the like which comprises charging lead in the congealed state under pressure into an extrusion chamber around a core within a die block at substantially right angles to the axis of the core, thereby causing the lead to divide as it encircles the core, raising the temperature of the lead in the chamber only at its region of mergence around the core to its fusion point, thereby causing the divided lead to homogeneously reunite, and then cooling that portion of the lead which had been heated to approximately the temperature of normally moving non-reheated lead prior to its reaching the extruding die.

CONRAD C. JACOBSON.